(12) United States Patent
Sengupta

(10) Patent No.: US 12,222,941 B2
(45) Date of Patent: Feb. 11, 2025

(54) SYSTEM AND METHOD FOR PROVIDING SQL QUALITY ANALYSIS AND SQL OPTIMIZATION IN RELATIONAL DATABASE

(71) Applicant: JPMorgan Chase Bank, N.A., New York, NY (US)

(72) Inventor: Aveek Sengupta, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 36 days.

(21) Appl. No.: 17/452,350

(22) Filed: Oct. 26, 2021

(65) Prior Publication Data
US 2023/0130738 A1 Apr. 27, 2023

(51) Int. Cl.
*G06F 16/2453* (2019.01)
*G06F 16/242* (2019.01)
*G06F 16/28* (2019.01)

(52) U.S. Cl.
CPC .... *G06F 16/24542* (2019.01); *G06F 16/2433* (2019.01); *G06F 16/284* (2019.01)

(58) Field of Classification Search
CPC ........... G06F 16/24542; G06F 16/2433; G06F 16/284
See application file for complete search history.

(56) References Cited

U.S. PATENT DOCUMENTS

| | | | |
|---|---|---|---|
| 11,068,483 B2* | 7/2021 | Marcel | G06F 16/24549 |
| 2011/0265064 A1* | 10/2011 | Hadar | G06F 11/3409 |
| | | | 717/121 |
| 2013/0031117 A1* | 1/2013 | Mandelstein | G06F 16/214 |
| | | | 707/758 |
| 2013/0268251 A1* | 10/2013 | Demuth | G06Q 10/067 |
| | | | 703/6 |
| 2016/0306846 A1* | 10/2016 | Adams, Jr. | G06F 16/2423 |
| 2018/0089271 A1* | 3/2018 | Kosuru | G06N 5/022 |
| 2018/0173712 A1* | 6/2018 | Sharma | G06F 16/24542 |
| 2019/0182168 A1* | 6/2019 | Bastide | H04L 47/24 |
| 2021/0097077 A1* | 4/2021 | Rogers | G06F 16/906 |
| 2021/0182703 A1* | 6/2021 | Velammal | G06N 5/046 |
| 2021/0224275 A1* | 7/2021 | Maheshwari | G06N 3/044 |

\* cited by examiner

*Primary Examiner* — Ann J Lo
*Assistant Examiner* — Fernando M Mari Valcarcel
(74) *Attorney, Agent, or Firm* — GREENBLUM & BERNSTEIN, P.L.C.

(57) ABSTRACT

A method of driving SQL optimization in a relational database by anti-pattern analysis of dynamic performance characteristics is provided. The method includes receiving a SQL statement, analyzing execution plan of the SQL statement and other SQL runtime statistics, and detecting presence of any anti-patterns for the SQL statement. The method also presents a list of recommendations for remediation of the anti-patterns. The method further includes calculating a quality index value for the SQL statement by performing a weighted analysis of a number of attributes. When the quality index value of the execution plan is determined to be greater than or equal to the predetermined threshold value, the execution plan is sent to a production environment for execution. When the quality index value of the execution plan is determined to be less than the predetermined threshold value, the execution plan is sent to a client terminal for remediation.

19 Claims, 9 Drawing Sheets

FIG. 8

SQA REPORT 800

Observations and Recommendations
810

Top Events at a Glance
820

Top Time Consuming Operations
830

Missing or Stale Optimizer Statistics
840

Instance Load Profile
850

Data Profile
860

SQL Execution Plan
870

SYSTEM AND METHOD FOR PROVIDING SQL QUALITY ANALYSIS AND SQL OPTIMIZATION IN RELATIONAL DATABASE

TECHNICAL FIELD

This disclosure generally relates to a system and method of driving Structured Query Language (SQL) optimization in relational databases by performing anti-pattern analysis of dynamic performance characteristics, and generating a numeric score to reflect a quality of SQL query.

BACKGROUND

The developments described in this section are known to the inventors. However, unless otherwise indicated, it should not be assumed that any of the developments described in this section qualify as prior art merely by virtue of their inclusion in this section. or that those developments are known to a person of ordinary skill in the art.

SQL is the most popular data processing language when it comes to interacting with any modem Relational Database Management Systems (RDBMS). SQL is a declarative and a non-procedural language, such that it merely provides instructions for an action to be performed but does not specify procedures for performing such action. Accordingly, SQL queries or statements can be transformed at runtime so that it may be merged, reorganized, and processed in any order. At a high level, for a given query and environment, an optimizer (or a cost optimizer) for the RDBMS assigns a relative numerical cost to each step of a potential execution plan, and then factors these values together to generate an overall cost estimate for the execution plan. After calculating the costs of alternative execution plans, the optimizer chooses the execution plan with the lowest cost estimate.

The numerical cost is derived based on the optimizer statistics, which may refer to a collection of data that describe a database, and objects included in the database. Table statistics include information on a number of rows in the table, a number of data blocks used for the table, as well as an average row length in the table, likewise, column statistics include information on the number of distinct values in a column (NDV) as well as a minimum and maximum value found in a column. The optimizer may use the column statistics information in conjunction with the table statistics (e.g., number of rows) to estimate the number of rows that will be returned by a SQL operation. SQL optimization may be a complicated process, and may be driven by a complex mathematical model. More often than not, due to complexity of this mathematical model as a result of huge number of variables, or lack of information about the underlying data due to missing or incorrect optimizer statistics or simply due to poorly written queries, the cost based optimizer may formulate an inefficient execution plan. The problems with the inefficient execution plans may lead to, without limitation, a drain of system and shared resources, degradation in response times, and impact on platform stability. Further, with exponential growth in data volumes and a need for more real time reporting, maintaining an optimal response time is an on-going concern and may become more challenging with time.

Moreover, accommodating for the shortcoming by the optimizer in such instances via manual optimization may not provide a realistic solution, as manual optimization may be extremely time consuming and tedious task. Further, manual optimization may be reactive in nature, which may be employed only after an incident has already occurred. Moreover, due to the complexity involved, the manual optimization may require a deep knowledge of internal workings of the RDBMS in order to identify and address the underlying issue. As such, the manual optimization requires people with a highly specialized skillset, which may often be unavailable and may be beyond capabilities of an average developer.

In view of the above noted deficiencies, there is a need for a structured framework that will help to systematically detect and remediate these performance issues in early stage of a systems development life cycle (SDLC), so that most of the issues may be prevented or addressed even before impacting production systems.

SUMMARY

SQL Quality Analyzer may refer to a product that address the above noted problems by providing a structured solution to systematically analyze execution plans and runtime query statistics of any query to identify anti-patterns in execution plans that may cause performance issues. The result of the analysis may be provided as a formatted text report, SQL Quality Report, which may include recommendations on improving the quality of the SQL, and provides various other insights like data profile for objects accessed, statistics profile of the objects involved in the SQL, top wait events and top operations encountered during the execution of the SQL. The SQL Quality Report may also generate a numeric score, SQL Quality Index, between 0 and 100, which may be representative of the quality of the SQL. Further, the SQL Quality Index value may be derived by performing a weighted analysis on resource usage, execution time, and impact of each step in the execution plan and the number of anti-patterns found in the execution plan. In an example, a higher score may indicate better quality, which may drive a decision of whether the code or execution plan is fit for execution in a production deployment or environment. The recommendations presented in SQL Quality Report may relate to the anti-patterns detected during the analysis process, and may also present possible actions to remediate the same.

The present disclosure, through one or more of its various aspects, embodiments, and/or specific features or sub-components, provides, among other features, various systems, servers, devices, methods, media, programs, and platforms for implementing a cloud native SQL Quality Analyzer system for driving SQL optimization in relational databases by performing anti-pattern analysis of dynamic performance characteristics, and generating a numerical score to reflect a quality of a SQL statement or query, but the disclosure is not limited thereto.

According to an aspect of the present disclosure, a method of driving SQL optimization in a relational database by anti-pattern analysis of dynamic performance characteristics for evaluating SQL quality. The method includes receiving, at a server and via a cloud network, a SQL statement; analyzing, at the server, an execution plan for the SQL statement; detecting a presence of any anti-pattern; detecting, for the execution plan, a presence of any anti-pattern; presenting a list of recommendations for remediation of the anti-pattern detected; calculating a quality index value for the SQL statement by performing a weighted analysis of many attributes including at least a number of anti-patterns, impact of the anti-patterns on overall response time, shared resource usage, response time and statistics profile; determining whether the quality index value is greater than or equal to a predetermined threshold value; when the quality index value of the execution plan is determined to be greater than or equal to the predetermined threshold value, sending the execution plan to a production environment for execution; and when the quality index value of the execution plan is determined to be less than the predetermined threshold value, sending the execution plan to a client terminal for recoding.

According to another aspect of the present disclosure, the anti-pattern is identified based on run time statistics and execution plan.

According to another aspect of the present disclosure, the anti-pattern is a number of objects above a predetermined value.

According to yet another aspect of the present disclosure, the method further includes identifying an execution time for executing the SQL statement, in which the anti-pattern includes at least one operation that accounts for more than a predetermined percentage of execution time of executing the SQL statement.

According to yet another aspect of the present disclosure, the method further includes identifying an execution time for executing the SQL statement, in which the anti-pattern includes at least one wait event that accounts for more than a predetermined percentage of execution time of executing the SQL statement.

According to a further aspect of the present disclosure, the anti-pattern includes an object referenced in the SQL statement with missing or stale optimizer statistics.

According to yet another aspect of the present disclosure, the execution plan is selected based on optimizer statistics in an environment.

According to a further aspect of the present disclosure, the anti-pattern is manually registered.

According to a further aspect of the present disclosure, the anti-pattern is automatically registered based on a pattern identification performed by a machine learning algorithm.

According to a further aspect of the present disclosure, the method further includes determining an environment identifier specifying a particular environment; and identifying a corresponding list of anti-patterns and thresholds based on the determined environment identifier, in which the anti-pattern is identified based on the list of anti-patterns and the thresholds corresponding to the determined environment identifier.

According to a further aspect of the present disclosure, threshold values are set differently for different anti-patterns.

According to a further aspect of the present disclosure, a threshold value for the anti-pattern is set differently for different environments.

According to a further aspect of the present disclosure, the detection of the anti-pattern includes identifying pre-configured patterns in execution plan that are known to cause degradation in performance, deviations from corresponding thresholds for SQL runtime statistics not limited to shared resource usage, one or more wait events that accounts for more than a predetermined percentage of execution time of the SQL statement, one or more operations that account for more than the predetermined percentage of execution time of the SQL statement, or one or more objects referenced in the SQL statement with missing or stale optimizer statistics.

According to another aspect of the present disclosure, the SQL quality index value ranges between 0 and 100.

According to another aspect of the present disclosure, the predetermined threshold values are configurable limits based on system resources.

According to another aspect of the present disclosure, the method further includes generating a formatted text report including an optimization recommendation for the SQL statement.

According to another aspect of the present disclosure, the anti-pattern is detected by comparing run time statistics of the SQL statement with an evolving list of anti-patterns.

According to another aspect of the present disclosure, a SQL quality analyzer system is provided. The SQL quality analyzer system includes a processor, a memory, and a communication circuit. The processor is configured to receive, via a cloud network, a SQL statement; analyze an execution plan for the SQL statement; detect, for the execution plan, a presence of any anti-pattern; calculating a quality index value for the SQL statement by performing a weighted analysis of many attributes including at least one of a number of anti-patterns, impact of the anti-patterns on overall response time, shared resource usage, response time and statistics profile; determine whether the quality index value is greater than or equal to a predetermined threshold value; when the quality index value of the execution plan is determined to be greater than or equal to the predetermined threshold value, the execution plan is sent to a production environment for execution; and when the quality index value of the execution plan is determined to be less than the predetermined threshold value, the execution plan is sent to a client terminal for recoding.

According to another aspect of the present disclosure, a non-transitory computer readable storage medium that stores a computer program for performing a projected graph based prediction is provided. The computer program, when executed by a processor, causing a system to perform a process. The process includes receiving, at a server and via a cloud network, a SQL statement; analyzing, at the server, an execution plan for the SQL statement; detecting, for the execution plan, a presence of any anti-pattern; calculating a quality index value for the SQL statement by performing a weighted analysis of many attributes including at least one of a number of anti-patterns, impact of the anti-patterns on overall response time, shared resource usage, response time and statistics profile; determining whether the quality index value is greater than or equal to a predetermined threshold value; when the quality index value of the execution plan is determined to be greater than or equal to the predetermined threshold value, sending the execution plan to a production environment for execution; and when the quality index value of the execution plan is determined to be less than the predetermined threshold value, sending the execution plan to a client terminal for recoding.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 8 illustrates a configuration of a SQA report in accordance with an exemplary embodiment.

DETAILED DESCRIPTION

Figure 1:
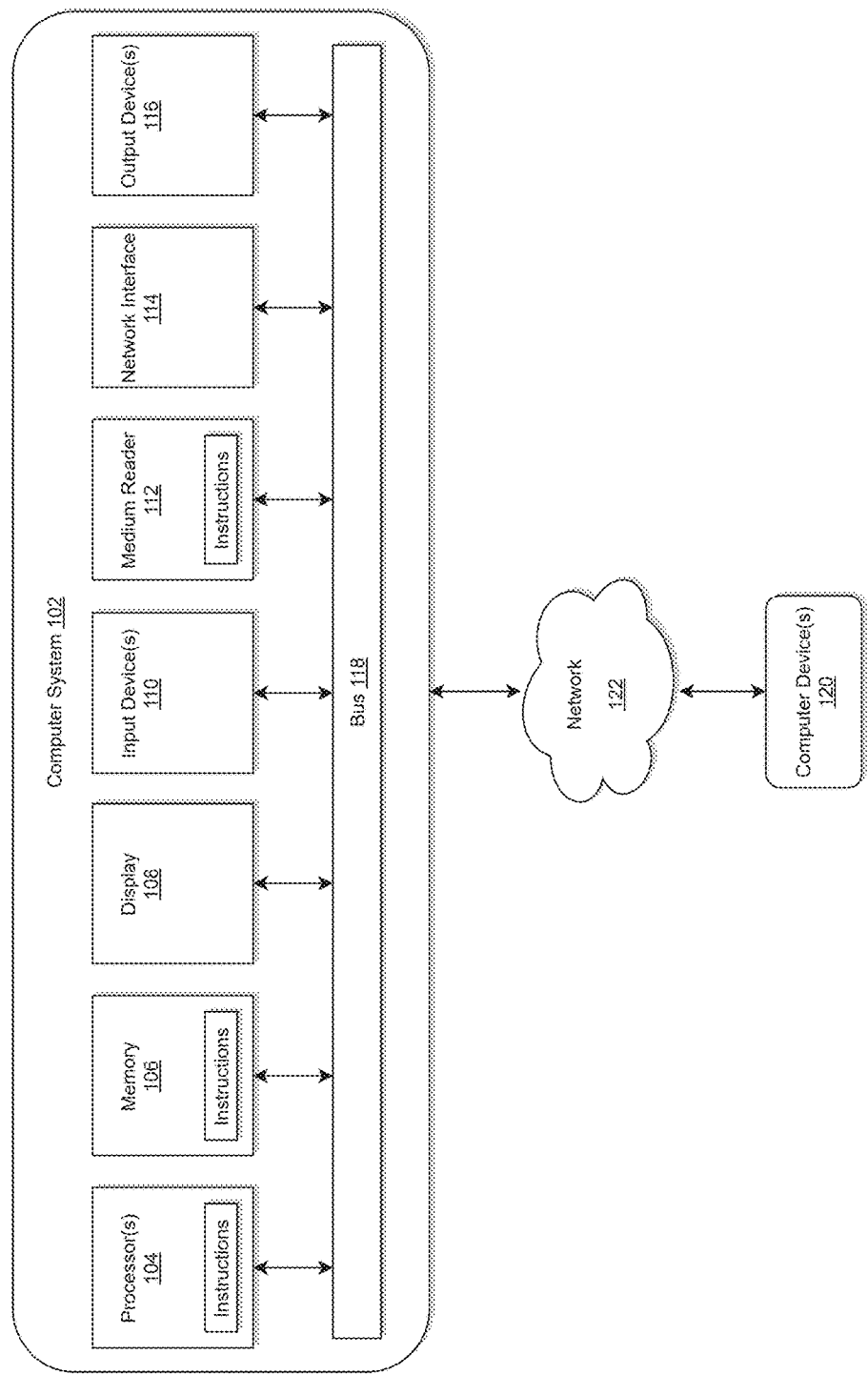
FIG. 1 illustrates a computer system for implementing a cloud native SQL Quality Analyzer (SQA) system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a cloud native SQL Quality Analyzer (SQA) system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time.

The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
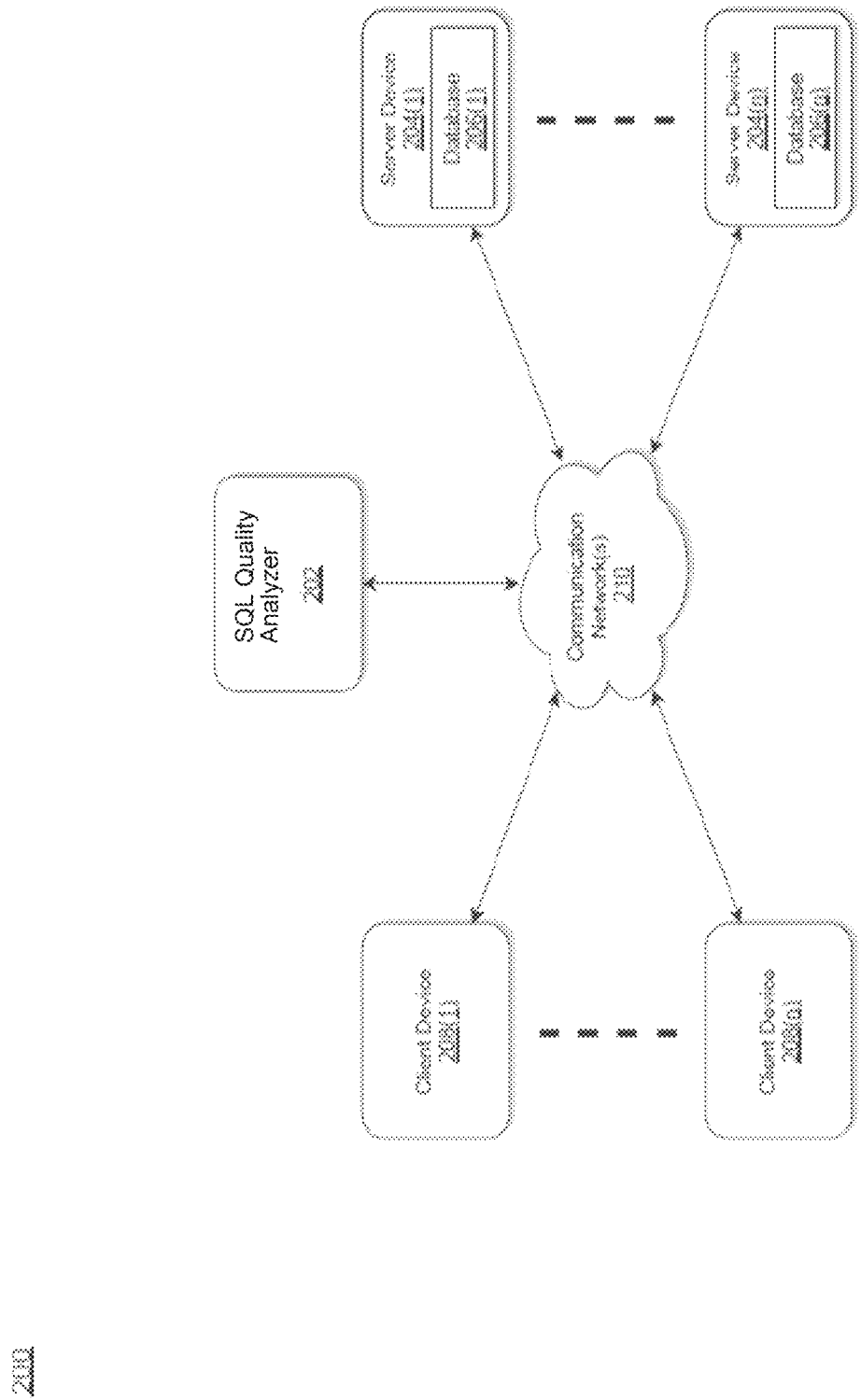
FIG. 2 illustrates an exemplary diagram of a network environment with a cloud native SQA system in accordance with an exemplary embodiment.

FIG. 2 illustrates an exemplary diagram of a network environment with a cloud native SQA system in accordance with an exemplary embodiment.

Figure 6:
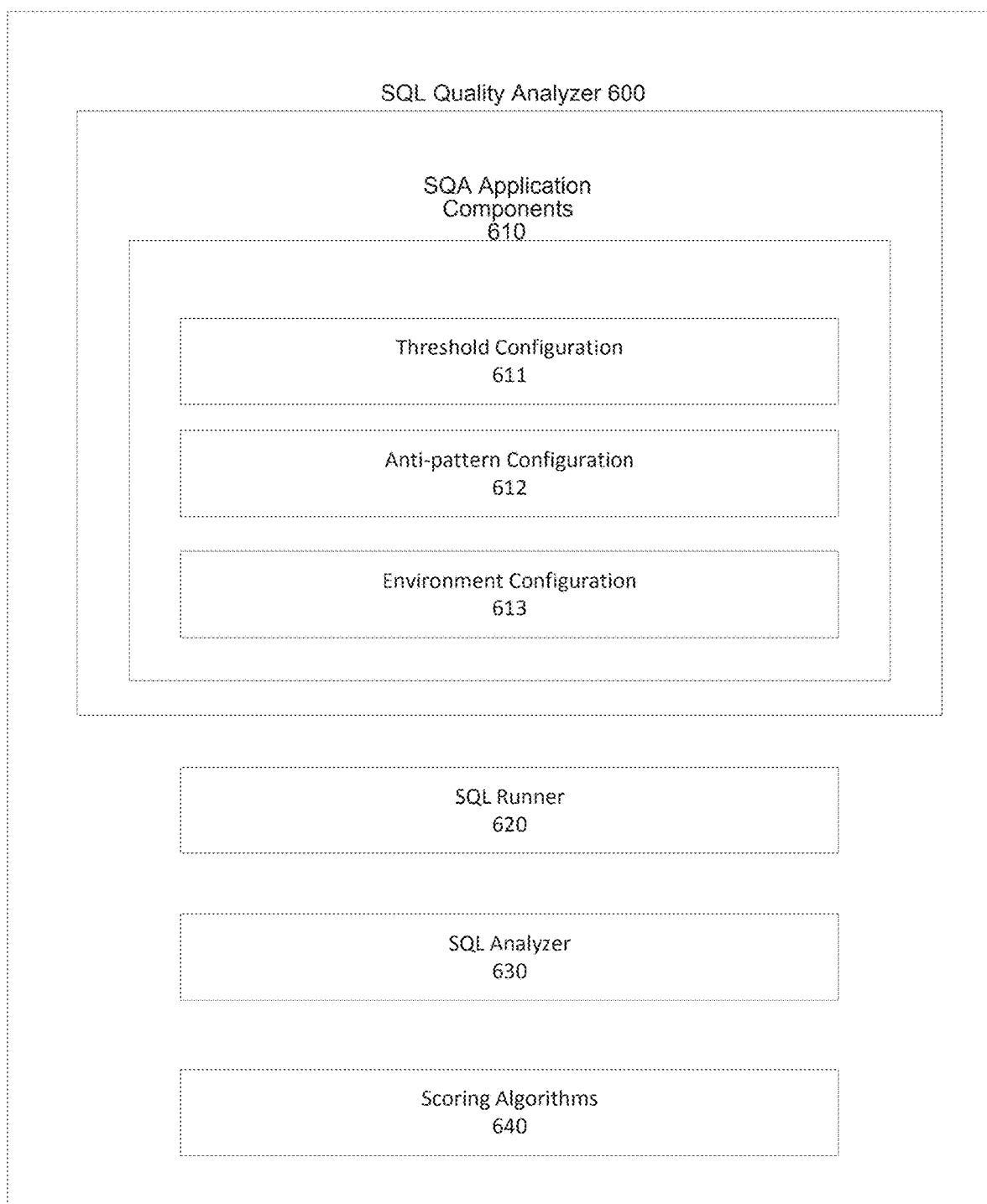
FIG. 6 illustrates a SQA system in accordance with an exemplary embodiment.

According to exemplary embodiments, the above-described problems associated with conventional lowest cost approach for performing a SQL query in a RBDMS may be overcome by implementing a SQA system 202 as illustrated in FIG. 2 that may provide a platform for implementing a cloud native SQA module(s) or component(s) (see e.g., FIG. 6). The SQA system 202 provides a structured solution to systematically analyze execution plans and runtime query statistics of any query to identify anti-patterns in execution plans that may cause performance issues. The result of the analysis may be provided as a formatted text report (e.g., SQL Quality Report), which may include recommendations on improving the quality of the SQL, and provides various other insights like data profile for objects accessed, statistics profile of the objects involved in the SQL, top wait events and top operations encountered during the execution of the SQL. The provided report may also generate a numerical score (e.g., SQL Quality Index) between 0 and 100, which may be representative of the quality of the SQL. Further, the numerical score may be derived by performing a weighted analysis on resource usage, execution time, and impact of each step in the execution plan and the number of anti-patterns found in the execution plan. In an example, a higher score may indicate better quality, which may drive a decision of whether the code or execution plan is fit for execution in a production deployment or environment. The recommendations presented in the generated report may relate to the anti-patterns detected during the analysis process, and also present possible actions to remediate the same.

The SQA system 202 may be the same or similar to the computer system 102 as described with respect to FIG. 1.

The SQA system 202 may store one or more applications that can include executable instructions that, when executed by the SQA system 202, cause the SQA system 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SQA system 202 itself, may be located in virtual server(s) running in a cloud-based computing environment rather than being tied to one or more specific physical network computing devices. Also, the application(s) may be running in one or more virtual machines (VMs) executing on the SQA system 202. Additionally, in one or more embodiments of this technology, virtual machine(s) running on the SQA system 202 may be managed or supervised by a hypervisor.

In the network environment 200 of FIG. 2, the SQA system 202 is coupled to a plurality of server devices 204(1)-204(n) that hosts a plurality of databases 206(1)-206(n), and also to a plurality of client devices 208(1)-208(n) via communication network(s) 210. A communication interface of the SQA system 202, such as the network interface 114 of the computer system 102 of FIG. 1, operatively couples and communicates between the SQA system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SQA system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs). Ethernet-based Packet Data Networks (PDNs), combinations thereof, and the like.

The SQA system 202 may be a standalone device or integrated with one or more other devices or apparatuses, such as one or more of the server devices 204(1)-204(n), for example. In one particular example, the SQA system 202 may be hosted by one of the server devices 204(1)-204(n), and other arrangements are also possible. Moreover, one or more of the devices of the SQA system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SQA system 202 via the communication network(s) 210 according to the HTTP-based protocol and/or JavaScript Object Notation (JSON) protocol, for example, although other protocols may also be used. According to a further aspect of the present disclosure, wherein the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SQA system 202 that may efficiently provide a platform for implementing a cloud native SQA module, but the disclosure is not limited thereto.

The client devices 208(1)-208(n) may run interface applications, such as standard web browsers or standalone client applications, which may provide an interface to communicate with the SQA system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SQA system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SQA system 202, the server devices 204(1)-204(n), or the client devices 208(1)-208(n), for example, may be configured to operate as virtual instances on the same physical machine. For example, one or more of the SQA system 202, the server devices 204(1)-204(n), or the client devices 208(1)-208(n) may operate on the same physical device rather than as separate devices communicating through communication network(s) 210. Additionally, there may be more or fewer SQA systems 202, server devices 204(1)-204(n), or client devices 208(1)-208(n) than illustrated in FIG. 2. According to exemplary embodiments, the SQA system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks. Packet Data Networks (PDNs), the Internet, intranets, and combinations thereof.

Figure 3:
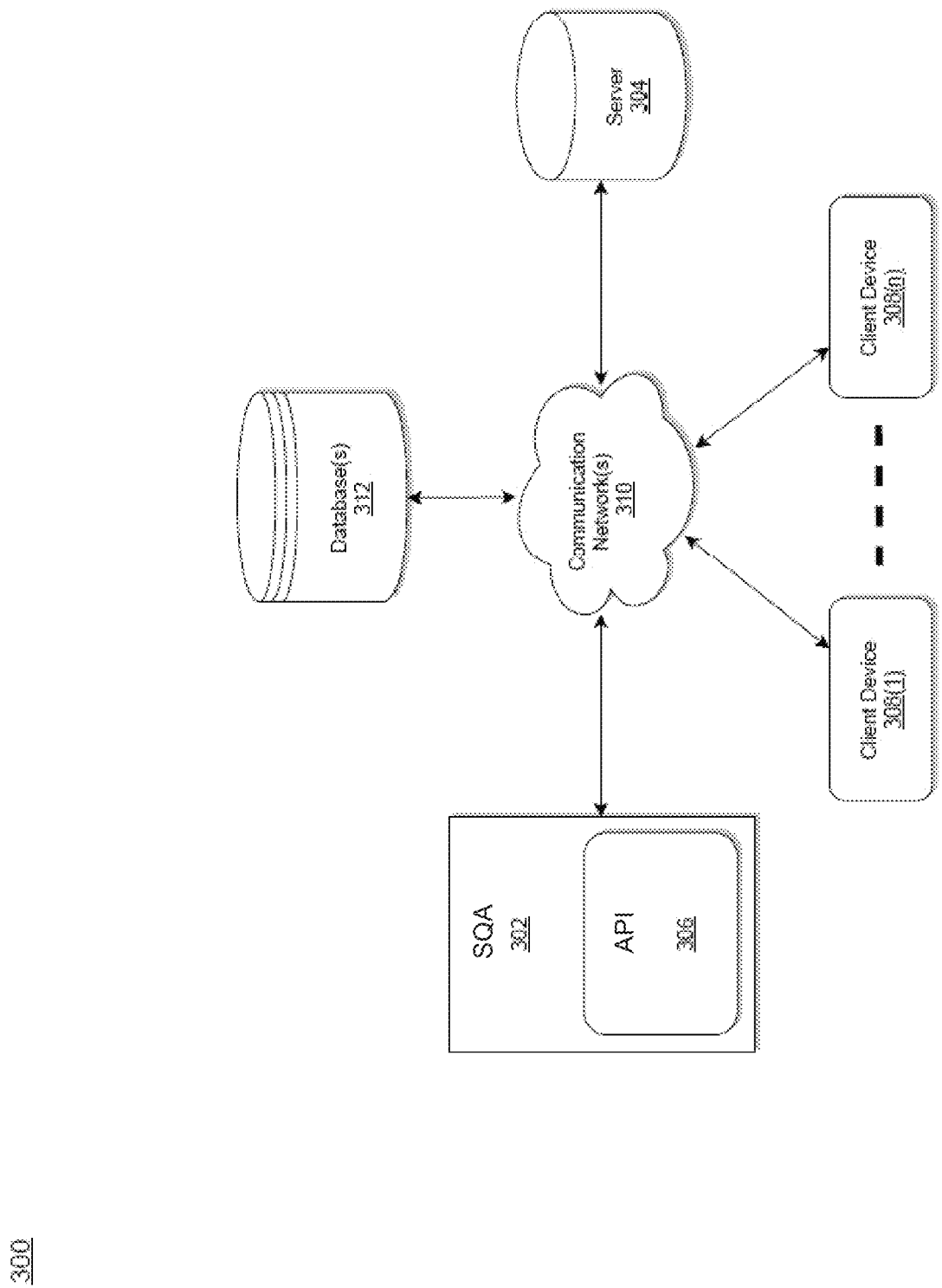
FIG. 3 illustrates a system diagram for implementing a cloud native SQA system in accordance with an exemplary embodiment.

FIG. 3 illustrates a system diagram for implementing a cloud native SQA system in accordance with an exemplary embodiment.

As illustrated in FIG. 3, the system 300 may include a SQL Quality Analyzer (SQA) system 302 within which a group of API modules 306 is embedded, a server 304, a database(s) 312, a plurality of client devices 308(1) . . . 308(n), and a communication network 310.

According to exemplary embodiments, the SQA system 302 including the API modules 306 may be connected to the server 304, and the database(s) 312 via the communication network 310. Although there is only one database has been illustrated, the disclosure is not limited thereto. Any number of databases may be utilized. The SQA System 302 may also be connected to the plurality of client devices 308(1) . . . 308(n) via the communication network 310, but the disclosure is not limited thereto.

According to exemplary embodiment, the SQA system 302 is described and shown in FIG. 3 as including the API modules 306, although it may include other rules, policies, modules, databases, or applications, for example. According to exemplary embodiments, the database(s) 312 may be embedded within the SQA system 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data from the plurality of client devices 308(1) . . . 308(n) via the communication network 310.

According to exemplary embodiments, as will be described below, the API modules 306 may include, without limitation, request management API, automation template API, and execution API. The API modules 306 may provide a master catalog providing access to different APIs. In an example, upon authentication of a user, the API modules 306 may provide various automation request templates corresponding to an access setting of the user as specified in user profile.

The request management API may allow the user to create new automation requests, schedule the automation requests, association requests with existing automation templates, association requests with executions, search for automation requests, check status of an automation request, and trigger creation, submission, and completion notification.

The automation template API may fetch automation template inputs form attributes, retrieve automation template variables, retrieve automation template rules/formats attributes, CRUD (create, read, update and delete) for reference data, and the like.

The execution API may, without limitation, trigger data ingestion process, trigger automation processing (e.g., validation, transformation, calculation, and arrangement), trigger storage and/or transfer of resulting data and documents, and read/write logs.

The API modules 306 may be configured to implement a user interface (UI) platform that is configured to enable SQA as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the SQA system 302. In this regard, the plurality of client devices 308(1) . . . 308(n) may be "clients" of the SQA system 302 and are described herein as such. Nevertheless, it is to be known and understood that the plurality of client devices 308(1) . . . 308(n) need not necessarily be "clients" of the SQA system 302, or any entity described in association therewith herein. Any additional or alternative relationship may exist between either or both of the plurality of client devices 308(1) . . . 308(n) and the SQA system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the SQA system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The SQA system 302 may be the same or similar to the SQA system 202 as described with respect to FIG. 2, including any features or combination of features described with respect thereto.

Figure 7:
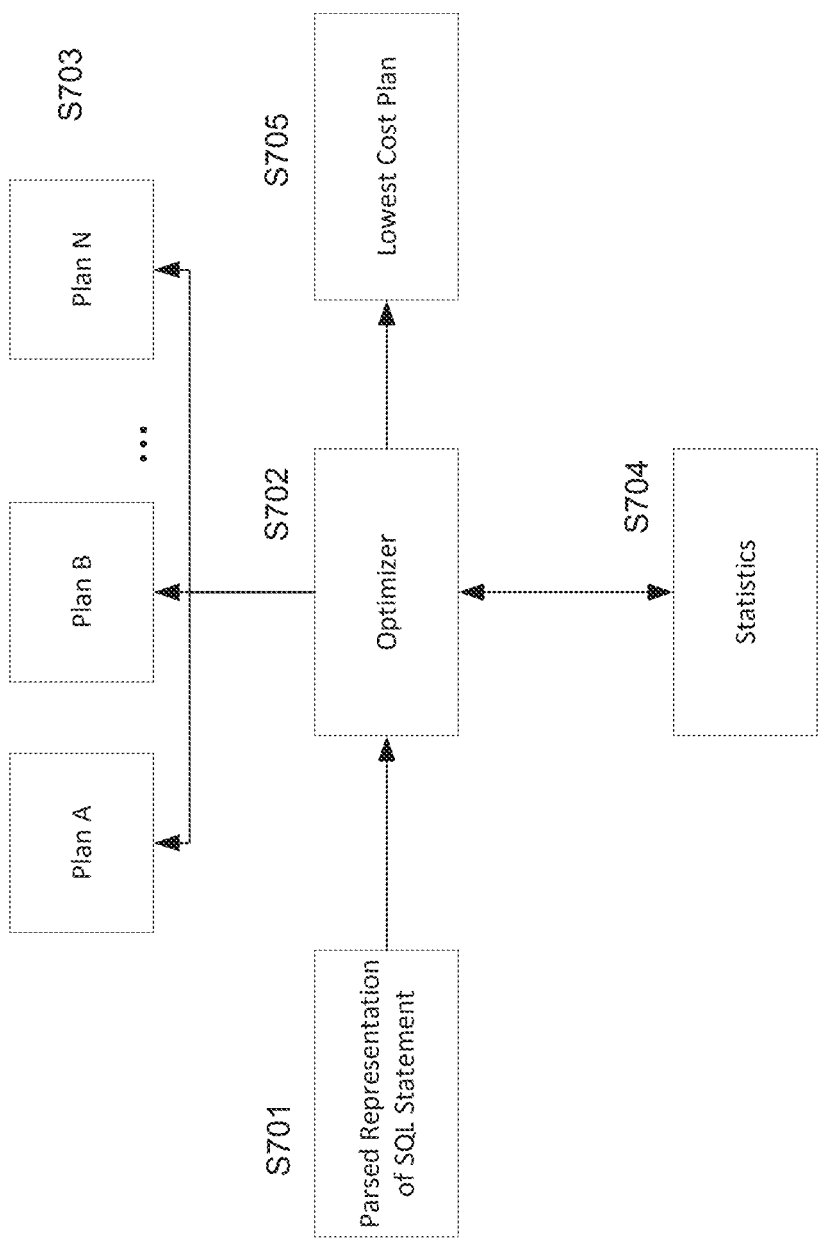
FIG. 7 illustrates a method for selecting a work plan for analysis by a SQA system in accordance with an exemplary embodiment.

FIG. 7 illustrates a method for selecting a work plan for analysis by a SQA system in accordance with an exemplary embodiment.

As illustrated in FIG. 7, in operation S701, a parsed representation of SQL statement is generated. The SQL statement is a declaratory statement, which does not specify a work plan indicating a sequential order of operations.

In operation S702, the parsed representation of SQL statement is then inputted to an optimizer for analysis. The optimizer may refer to a piece of software that attempts to generate the most optimal execution plan for executing the SQL statement. This determination may be an important step in the processing of any SQL statement. Often, a SQL statement may be executed in many different ways and/or order. More specifically, tables or indexes may be accessed in a different order. For example, the way Oracle database system executes a statement can greatly affect execution time. The optimizer choose the plan with the lowest cost among all considered candidate plans. The optimizer uses available optimizer statistics to calculate cost. For a specific query in a given environment, the cost computation may account for factors of query execution such as I/O, CPU, and communication. Although the present application is described with respect to the Oracle database as an example of a RBDMS, aspects of the present disclosure are not limited thereto, such that other RBDMS may be utilized.

In operation S703, the optimizer generates multiple work or execution plans and compares them based on optimizer statistics obtained for query optimization in operation S704. Query optimization may refer to an overall process of choosing the most efficient means of executing a SQL statement. The database may attempt to optimize each SQL statement based on statistics collected about the accessed data. The optimizer may determine the optimal execution plan for a SQL statement by examining multiple access methods, such as full table scan or index scans, different join methods such as nested loops and hash joins, different join orders, and possible transformations. For a given query and environment, the optimizer may assigns a relative numerical cost to each step of a possible execution plan, and then factors these values together to generate an overall cost estimate for the execution plan. After calculating the costs of alternative execution plans, the optimizer may choose the execution plan with the lowest cost estimate.

As noted above, the numerical cost for a possible execution plan is derived based on the optimizer statistics, which are a collection of data that describe the database, and the objects in the database. Table statistics may include information on the number of rows in the table, the number of data blocks used for the table, as well as the average row length in the table. Likewise, column statistics include information on the number of distinct values in a column (NDV) as well as the minimum and maximum value may be found in the column. The optimizer may use the column statistics information in conjunction with the table statistics (e.g., number of rows) to estimate the number of rows that will be returned by a SQL operation.

In an example, the work plans may specify a sequence of order of execution of certain operations. As illustrated in FIG. 7, the multiple work plans may include at least Plan A, which provides a particular order of execution, Plan B, which provides a different order of execution, and up to Plan N (N being any integer), which provides yet a different order or execution. Based on the cost information provided by the optimizer statistics, a lowest cost work plan is selected and outputted for executing the SQL statement or query. Such work plan may then be analyzed by the SQA to determine whether such work plan should proceed to a production environment. However, aspects of the present application are not limited thereto, such that the generated work plans may be analyzed by the SQA prior to selection.

Figure 4A:
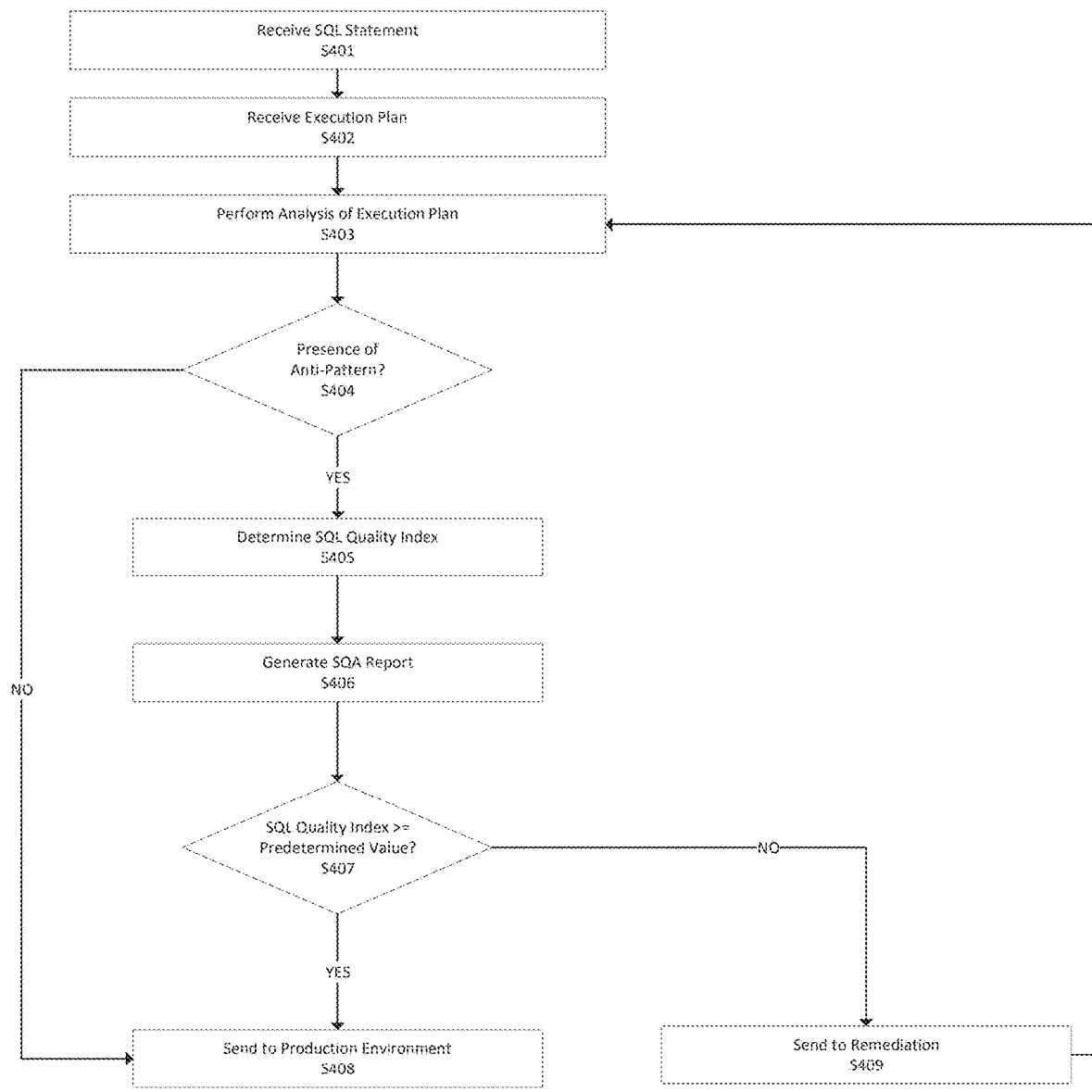
FIG. 4A illustrates a method for dynamically detecting anomaly in execution plans and performing dynamic analysis in accordance with an exemplary embodiment.

FIG. 4A illustrates a method for dynamically detecting anomaly in execution plans and performing dynamic analysis in accordance with an exemplary embodiment.

Although the optimizer may be able to provide the lowest cost solution in the RDBMS under certain conditions (e.g., limited number of objects), such performance is not always reliable. In certain scenarios, such as when a number objects included in a SQL query is larger, the optimizer may be unable to provide a reliable lowest cost work plan for execution in the RDBMS because it is unable to perform costing of all possibilities in reasonable time. Further, such determination of sub-optimal plans may not be uncovered until recognized by a highly technical personnel, which will then be analyzed to determine a cause for the issue.

In view of such deficiencies and potential instability, SQL Quality Analyzer is introduced, which address the above noted problems by providing a structured systematic solution to dynamically analyze execution plans and runtime query statistics of any query to identify one or more defined anti-patterns in execution plans that may cause performance issues. The result of the analysis may be provided as a formatted text report (i.e., SQL Quality Report), which may contain recommendations on improving the quality of the SQL, and provides various other insights like data profile for objects accessed, statistics profile of the objects involved in the SQL, top wait events and top operations encountered during the execution of the SQL. Further, the SQL Quality Report may generate a numerical score, as a SQL Quality index, which may range between 0 and 100. The numerical score may be representative of the quality of the SQL. The numerical score may be derived by performing a weighted analysis on resource usage, execution time, and/or impact of each step in the execution plan and a number of anti-patterns found in the execution plan. In an example, a higher score may indicate better quality, and it will drive the decision whether the code or execution plan is fit for production deployment. The recommendations presented in the SQL quality report may relate to the anti-patterns detected during the analysis process, and present possible actions to remediate the detected anti-patterns.

In an example, an anti-pattern may be detected by, without limitation, identifying pre-configured patterns in execution plan that are known to cause degradation in performance, identifying deviations from corresponding thresholds for SQL runtime statistics not limited to shared resource usage, identifying one or more wait events that accounts for more than a predetermined percentage of execution time of the SQL statement, identifying one or more operations that account for more than the predetermined percentage of execution time of the SQL statement, or identifying one or more objects referenced in the SQL statement with missing or stale optimizer statistics.

As illustrated in FIG. 4A, a SQL query is received at an SQL quality analyzer (SQA) in operation S401. In an example, SQL query is provided as a declaratory statement, in which no specific sequence of operations are specified.

For the provided SQL query, one or more execution plans for the SQL query is received in operation S402. In an example, an execution plan may refer to a series of sequential operations executed by the database to execute a SQL statement or query. A row source tree may serve as the core of the execution plan. The execution plan may show a combination of the steps a relational database (e.g., Oracle database) may use to execute the SQL statement or query. Each step may either retrieve rows of data from the database or prepare them for the user issuing the SQL statement or query. In an example, an execution plan may include, without limitation, (i) an ordering of the tables (e.g., row source tree) referenced by the statement, (ii) an access method for each table mentioned in the statement, (iii) a join method for tables affected by join operations in the statement, (iv) data operations like filter, sort, or aggregation, and (v) cost and cardinality associated with each operation.

In operation S403, an analysis of the execution plan(s) is performed. The analysis performed may be performed based on runtime statistics generated when running the execution plan(s). In an example, runtime statistics of the execution plan(s) may include, without limitation, data profile for objects accessed, statistics profile of the objects involved in the SQL, top wait events and top operations encountered during the execution of the SQL. In an example, runtime statistics may be obtained from a lower environment, such as a development or testing environment.

In operation S404, analysis is performed to determine a presence of an anti-pattern in the analyzed execution plan(s) based on the runtime statistics in operation S404. Anti-patterns may refer to patterns occurring in SQL or SQL execution plans that are known to cause poor performance and response times. These patterns may manifest due to different reasons, including, but not limited to, poor coding practices and inefficient execution plans. For example, poor coding practices may include, without limitation, use of deprecated hints, using many to many joins and subsequently suppressing duplicates using DISTINCT clause, improper use of PARALLEL hint, and absence of partition pruning due to improper use of partitioned columns, suppression of indexes due to improper use of indexed columns, accessing same objects multiple times and many more.

Inefficient execution plans may be formulated by an optimizer of the RDBMS. Some of the inefficiencies formulated by the optimizer may include, without limitation, (i) missing optimizer statistics, (ii) an inability of the optimizer to compute the cost and cardinality accurately for any operation due to complexity of the predicates involved or oddities in the mathematical model for computation of multi-predicate selectivity, and (iii) a large numbers of Objects used in a SQL, potentially limiting the optimizer's ability to cost all possible access path and access orders.

If it is determined that no anti-pattern is detected in the execution plan in operation S404, then the execution plan is sent to a production environment in operation S408 for performance of the execution plan.

Alternatively, if it is determined that any anti-pattern is detected in the execution plan in operation S404, a SQL quality index is determined in operation S405. The SQL quality index may be determined based on the runtime statistics, and may indicate a numerical value between 0 to 100. In an example, the SQL quality index or the SQL quality index value may be calculated by performing a weighted analysis of many attributes including at least one of a number of anti-patterns in the execution plan, impact of the anti-patterns on overall response time, shared resource usage, response time and statistics profile. However, aspects of the present disclosure are not limited thereto, such that pass/fail indicating may be provided, a category of quality may be indicated (e.g., good, fair, poor and etc.), and any other value indicating a differentiation of quality may be utilized.

Further, in operation S406, a SQA report is generated. The SQA report may be a formatted report that contains optimization recommendations for the query, and many other useful information to facilitate easy optimization. The SQA report may be a text report, and may include, without limitation, an Observations and Recommendations section, a Top Events at a Glance section, a Top Time Consuming Operations section, a Missing or Stale Optimizer Statistics section, an Instance Load Profile section, a Data Profile section, and a SQL Execution Plan section. A more detailed description of the information included in the SQA report is provided in the description of FIG. 8. Although the SQL quality index is illustrated as being performed prior to the generation of the SQA report, aspects of the disclosure are not limited thereto, such that SQA report may be generated prior to the determination of the SQL quality index.

In operation S407, a determination as to whether SQL quality index is greater than or equal to a predetermined value is made. In an example, the predetermined value may be manually set or may be automatically adjusted by machine learning based on accumulated data. The predetermined value may indicate a minimum value indicating tolerable impact on system performance. More specifically, the predetermined value may indicate whether the effect of the identified anti-pattern may be negligible or within tolerance of system performance. In an example, if the identified anti-pattern results in a negligible impact in performance, anti-pattern may potentially be removed from a stored library of anti-patterns.

If the SQL quality index is determined to be greater than or equal to the predetermined value in operation S407, the execution plan is sent to the production environment for execution in operation S408. In other words, even if the execution plan is determined to include an anti-pattern, if its impact to the execution plan is limited, such that it does not lower the SQL quality index value to be lower than the predetermined value, the execution plan including the limited impact anti-pattern may proceed to the production environment.

On the other hand, if the SQL quality index is determined to be less than the predetermined value in operation S407, then the execution plan is sent to remediation in operation S409. Once sent, the execution plan may be directed to a developer for modification of code or automatically fixed by a machine learning computer. For example, if the anti-pattern identified is a recognized pattern that has a corresponding solution, the machine learning computer may modify the execution plan without human intervention. In an example, any suitable machine learning algorithm may be utilized for performance of pattern recognition and providing of corresponding solutions. On the other hand, if the anti-pattern is unique or is one with limited data, a developer may make a manual fix until the machine learning computer adapts to the newly recognized anti-pattern. In an example, the developer may modify the database code to remove or address at least some of the predetermined conditions.

Once modified, the modified execution plan is sent back to operation S403 for analysis. If the SQL quality index of the modified execution plan is determined to be above or equal to the predetermined value, the modified execution plan will be sent to the production environment for performance.

Figure 4B:
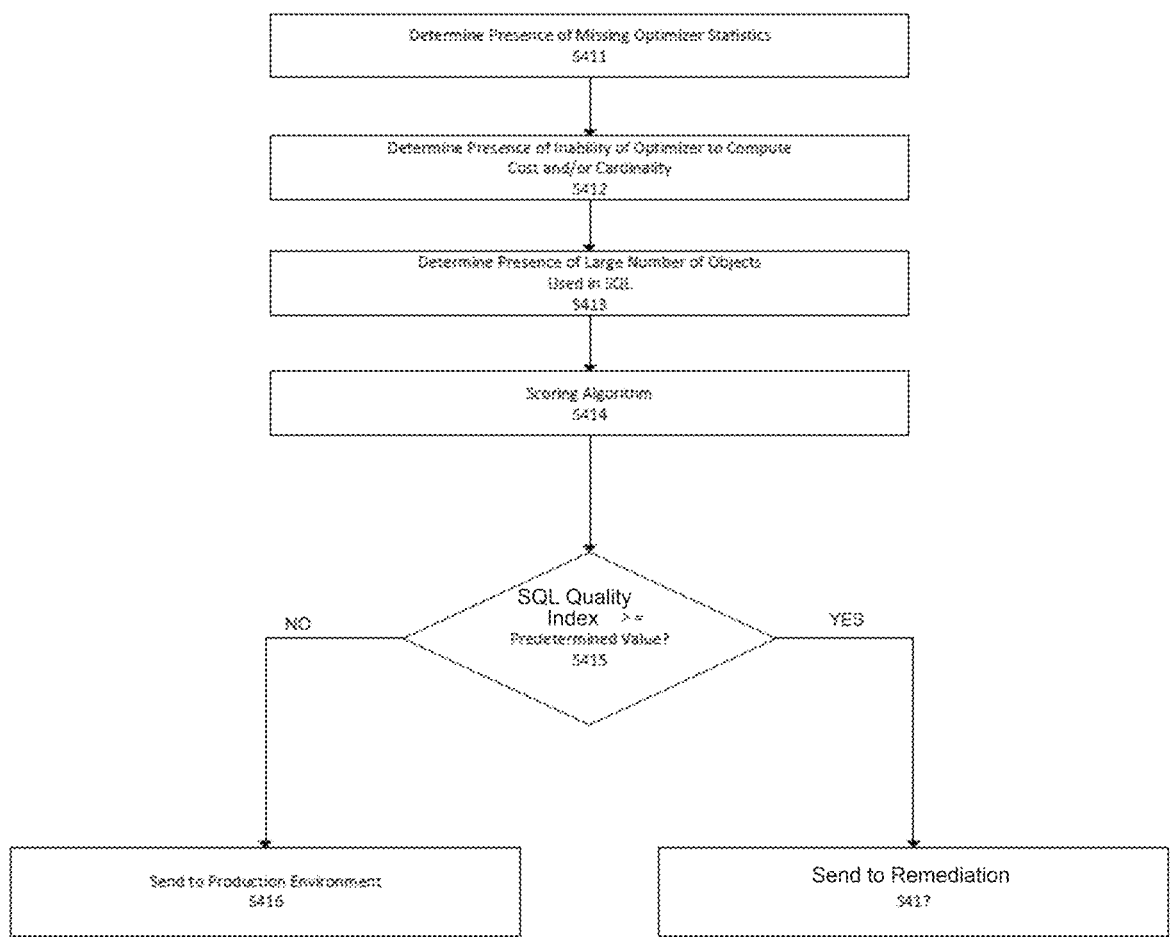
FIG. 4B illustrates a method for determining an impact of an anomaly detected in an execution plan in accordance with an exemplary embodiment.

FIG. 4B illustrates a method for determining an impact of an anomaly detected in an execution plan in accordance with an exemplary embodiment.

In operation S411, a determination of presence of missing optimizer statistics is made. Optimizer statistics may refer to a collection of data that describe a database, and objects included in the database. These statistics are used by an optimizer to choose the best execution plan for each SQL statement or query. The optimizer statistics may be stored in system tables, which may be accessed with appropriate privileges. Optimizer statistics that influence formulation of the execution plan may include, without limitation, table statistics, column statistics, index statistics and system statistics. The table statistics may include, without limitation, a number of rows, a number of blocks, and an average row length. The column statistics may include, without limitation, a number of distinct values (NDV) in column, a number of nulls in column, data distribution (histogram), and extended statistics. The index statistics may include, without limitation, a number of leaf blocks, levels, and clustering factor. The system statistics may include, without limitation, I/O performance and utilization, and CPU performance and utilization. Optimizer statistics may be either gathered automatically or manually, based on system requirements.

In operation S412, a determination of whether the optimizer is unable to accurately compute cost and/or cardinality. In an example, the optimizer may be unable to accurately computer for any operation in the execution plan due to complexity of predicates involved or oddities in a mathematical model for computation of multi-predicate selectivity. However, aspects of the present disclosure are not limited thereto, such that the optimizer may be unable to accurately compute cost and/or cardinality for other reasons.

In operation S413, a determination of whether a large number of objects are used in the SQL query is determined. In an example, the optimizer may be able to effectively select an execution plan based on cost analysis when a number of objects used in the SQL query is relatively small. However, when the number objects used in the SQL query is larger, a selection of an execution plan based on cost analysis may not be as consistent. In other words, when the number of objects used in the SQL query is larger, there may be too much variations in the execution plan generated at different times, which may lead to very unstable performance.

Based on the determinations in operations S411, S412 and S413, a SQL quality index for the execution plan is calculated using a scoring algorithm in operation S414. In an example, scoring is a function of number of observations with regards to anti pattern analysis and their impact on the overall response time, shared resource usage (e.g., CPU, I/O, Temp and etc.), overall response time and statistics profile. It performs a weighted analysis of these parameters based on the deviation from configured thresholds. Furthermore, based on the performance goals of the system, the weights can be adjusted to give more importance to I/O based observation or CPU based observation, depending on whether the system is CPU or I/O bound. The default configuration gives equal weight to I/O based observation or CPU based observation. The scoring may be a numerical figure with a maximum possible value of 100, and it is a reflection of the quality of the SQL, and hence the name SQL Quality Index.

In operation S415, a determination as to whether SQL quality index is greater than or equal to a predetermined value is made. In an example, the predetermined value may be manually set or may be automatically adjusted by machine learning based on accumulated data. The predetermined value may specify a minimum value indicating tolerable impact on system performance. More specifically, the predetermined value may indicate that the impact of the predetermined conditions, such as anti-pattern, may be negligible or within tolerance of system performance.

If the SQL quality index is determined to be greater than or equal to the predetermined value in operation S415, the execution plan is sent to the production environment in operation S416.

If the SQL quality index is determined to be less than the predetermined value in operation S415, the execution plan is then sent to remediation for modification of database code in operation S417.

Although operations of S411, S412 and S413 are illustrated as being performed in a particular sequence, aspects of the present disclosure are not limited thereto, such that the operations of S411, S412 and S413 may be executed in any particular order or sequence.

Further, although various features of the present application were discussed in view of the Oracle database as an example, aspects of the present application are not limited thereto, such that the above noted concepts and features apply to any modem relational database using a cost-base optimizer.

Figure 5:
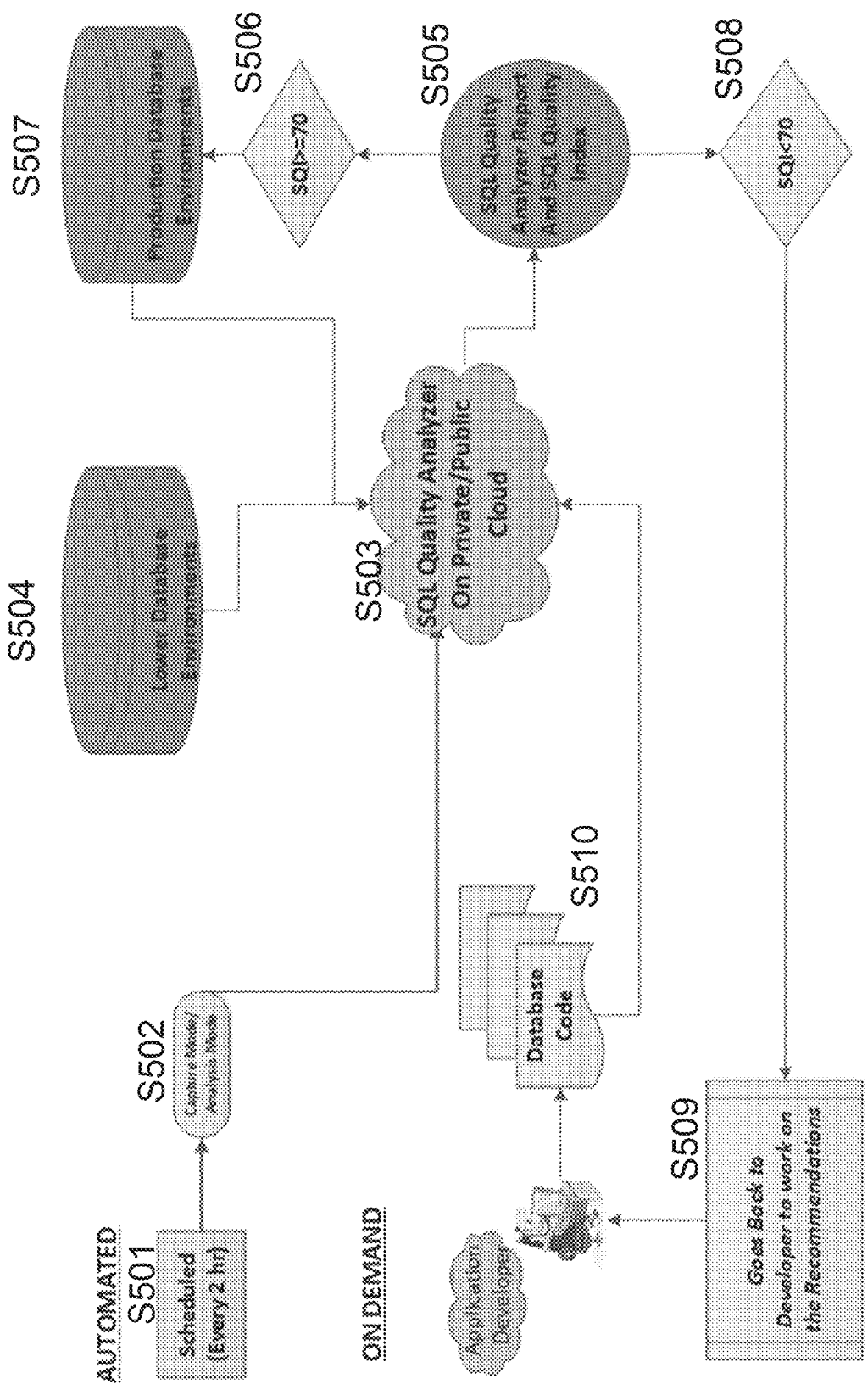
FIG. 5 illustrates a system diagram of a SQL Quality Analyzer in accordance with an exemplary embodiment.

FIG. 5 illustrates a system diagram of a SQL Quality Analyzer (SQA) in accordance with an exemplary embodiment.

In operation S501, SQA application may be automatically executed at predetermined intervals. For example, the SQA application may be scheduled to run every two hours, and it can then analyze all the queries that ran against a specific database within the last 2 hours for detection of anti-patterns. The result of the analysis may be stored in any intermediate objects, and it can be consumed by relevant parties.

In operation S502, the database system operates in a capture mode or analysis mode, which captures the generated execution plans, and sends the generated execution plans to the SQA system. The SQA system may reside on a cloud, which may be private or public.

In operation S503, for each of the generated execution plans, an analysis is performed to detect a presence of an anomaly. For example, an anomaly may include, without limitation, presence of one or more anti-patterns, an inability to compute cost and/or cardinality, a presence of a large number of objects used in SQL, and other inefficiencies formulated by the optimizer.

Anti-patterns may refer to patterns occurring in SQL or SQL execution plans that are known to cause poor performance and response times. These patterns may manifest due to different reasons, such as poor coding practices and/or inefficient execution plans.

In an example, poor coding practices may include use of deprecated hints, using many to many joins and subsequently suppressing duplicates using DISTINCT clause, improper use of PARALLEL hint, an absence of partition pruning due to improper use of partitioned columns, suppression of indexes due to improper use of indexed columns, and accessing same objects multiple times and many more.

Moreover, in an example, the anomalies or anti-patterns may be detected based on runtime statistics and a library of recognized or predefined anomalies or anti-patterns from lower database environments. The runtime statistics may be stored separately from the library of recognized or predefined anomalies or anti-patterns. Lower database environments may include, without limitation, a development environment and a testing environment. In operation S504, runtime statistics and/or other data may be provided by the lower database environments to the SQA system.

In an example, the library of recognized or predefined anomalies or anti-patterns may be manually specified/adjusted, and may be accessed by different systems. Further, the SQA system may further leverage machine learning algorithms to continually identify potential anti-patterns and add such anti-patterns to the library. More specifically, the process of discovery of anti-patterns may be enhanced using database machine learning algorithms so that the anti-patterns are more system specific. The existing set of anti-patterns may be used for supervised learning in order to evaluate the effectiveness of the machine learning model, whether it is able to correctly identify these anti-patterns based on analysis of system data. After the machine learning model has evolved or matured, the machine learning model may move to an unsupervised learning model, in which the anti-patterns may be automatically discovered and integrated with the parent module. Once integrated, future SQL queries against this specific system may be checked against such anti-pattern, which may be detected thus preventing any future issues due to the same anti-pattern.

Based on the impact of the anti-patterns with respect to the thresholds, the library of anti-patterns or anomalies may be continually adjusted to add or remove select anti-patterns or anomalies.

Based on the runtime statistics and the library of recognized or predefined anomalies or ant-patterns, one or more anomalies or anti-patterns may be detected or identified in an execution plan. Further, upon detection or identification of one or more anomalies or anti-patterns in the respective execution plan, an impact of the detected anomaly or anti-pattern is determined, which may vary. For example, not every anomaly or anti-pattern may have a noticeable impact on the execution performance of the SQL statements or queries. Based on the detected anomalies or anti-patterns, an SQA report and SQL quality index value are generated for the respective execution plan in operation S505.

In an example, the SQA report may include observations and recommendations. Further, the SQA report may specify a list of top events (e.g., top five) that account for more than a predetermined threshold value (e.g., 10%) of the execution time. The SQA report may also specify list of top time consuming operations (e.g., top five) that account for more than a predetermined threshold value (e.g., 10%) of the execution time. The SQA report may also provide load information of a database instance accessed when the SQA was being executed, data volume information corresponding to different row sources, and the like. In view of such information, and different weighting thereof, a SQL quality index value is calculated, indicating a quality of the execution plan for a SQL query or statement.

If the calculated SQL quality index value is determined to be greater than or equal to a predetermined threshold value (e.g., 70) in operation S506, then the respective execution plan is transmitted to a production database environment S507.

Alternatively, if the calculated SQL quality index value is determined to be less than the predetermined threshold value (e.g., 70) in operation S508, the execution plan is sent back to a developer to work on the recommendations specified in the SQA report in operation S509. Although FIG. 5 illustrates that the execution plan is sent to the developer for rework, aspects of the present disclosure are not limited thereto. For example, the execution plan may be modified automatically by a machine learning system based on the recommendations specified in the SQA report or based on its internal settings. More specifically, the machine learning system with access to a library of more common or frequent anti-patterns may have a library of corresponding solutions that may be automatically launched upon identification of such anti-patterns. Accordingly, in such a case, the SQA report may specify the anti-pattern and recommendations proposed as well as automated actions taken by the SQA system or the machine learning system to resolve the anti-pattern.

Once the execution plan or the database code is modified in operation S510, the modified database code or execution plan is sent back to the SQA system for analysis, repeating operation S503 and subsequent operations.

FIG. 6 illustrates a SQL Quality Analyzer (SQA) system in accordance with an exemplary embodiment.

The SQA system 600 includes a SQA application component 610, a SQL runner 620, a SQL analyzer 630, and scoring algorithms 640. The SQA application component 610 includes a plurality of configuration tables. The plurality of configuration tables include a threshold configuration 611, an anti-pattern configuration 612, and an environment configuration 613.

The SQA application 610 may be written in PL/SQL or any other language of choice. The threshold configuration may include threshold information including a threshold identifier (e.g., unique identifier for a specific threshold), threshold description, a threshold value, an environment type (e.g., OLTP or OLAP) and an environment identifier. If environment specific thresholds have not been configured based on specific performance goals of the system, then the pre-defined default thresholds may be used based on the type of the environment. The pre-defined thresholds may be configured based on industry standards for the specific environment type.

In an example, thresholds may refer to configurable limits based on system resources. It may be used to indicate the acceptable limits for various shared resources like Parallel Slaves usage, TEMP usage, CPU and I/O usage and many more, based on the performance goals of the system. Furthermore, it may be used to limit various attributes of query execution like number of objects used, length of the execution plan, overall response time and the like. The thresholds may also apply to specific anti-patterns in order to ensure that the validation is relevant and it has a sizeable impact on the overall execution plan. For, example, when checking for incorrect join order for HASH JOIN, the row sources should be above a certain threshold in terms of size otherwise the impact will be negligible.

The anti-pattern configuration 612 may store various information of defined list of anti-patterns. The list of anti-patterns may include anti-patterns that are predefined by users. However, aspects of the disclosure are not limited thereto, such that machine learning algorithms or models may identify additional anti-patterns based on performance metrics and add the newly identified anti-patterns to the existing list of anti-patterns.

The anti-pattern configuration 612 may store a name of the anti-pattern, associated code to detect the anti-pattern and category of the anti-pattern (e.g., Compute, IO, optimizer etc.). There may be APIs exposed for the maintenance of the anti-patterns, which may operate as an evolving library of anti-patterns, more like an open source, such that anybody may contribute a new anti-pattern to the library, which may subsequently be adopted by any environment team.

However, the process of discovery of anti-patterns may further be enhanced using database machine learning algorithms so that the anti-patterns are more system specific and thus more effective. The existing set of anti-patterns will be used for supervised learning in order to evaluate the effectiveness of the machine learning model, whether it is able to correctly identify these anti-patterns based on analysis of system data. After the model has been evolved, it will move to unsupervised learning model, wherein the anti-patterns will be automatically discovered and integrated with the parent module. Once integrated, future SQL queries against this specific system will always be checked for this anti-pattern, which will be detected thus preventing any future issues due to the same anti-pattern.

The environment configuration 613 may store the relationship between specific environments to threshold profile and list of anti-patterns that applies to a specific environment. In the absence of environment specific configuration, the SQA system may use a default configuration that is available based on the type of the environment.

The SQL Runner 620 may be responsible for executing the SQL and it exposes an API that accepts SQL text, bind variables (if any), environment identifier and the database connection URL. Based on the connection URL it connects to the appropriate database, and executes the query that has been submitted. After the query execution is completed, it generates runtime statistics and passes the control to the SQL Analyzer.

The SQL analyzer 630 may be responsible for orchestrating the analysis process and generating the SQA report. It gets the SQL identifier and environment identifier as inputs from the SQL runner 620. Based on the environment identifier, the SQL analyzer 630 identifies the list of anti-patterns and thresholds from the environment configuration and then executes the code configured for detection of these anti-patterns from the anti-pattern configuration table. The results from anti-pattern analysis may be stored in memory structures. The SQL analyzer 630 may then consume all the information from memory and run the scoring algorithm to generate a final score. The scoring algorithm is discussed in details below.

The scoring algorithms 640 may be a function of number of observations with regards to anti pattern analysis and their impact on the overall response time, shared resource usage (e.g., CPU, I/O and Temp), overall response time and statistics profile. The scoring algorithms 640 may perform a weighted analysis of these parameters based on the deviation from configured thresholds. Furthermore, based on the performance goals of the system, the weights may be adjusted to give more importance to I/O based observation or CPU based observation, depending on whether the system is CPU or I/O bound. The default configuration gives equal weight to I/O based observation or CPU based observation. The scoring is numerical figure with a maximum possible value of 100, and it is a reflection of the quality of the SQL, and hence the name SQL Quality Index.

FIG. 8 illustrates a configuration of a SQA report in accordance with an exemplary embodiment.

SQA report 800 may be a formatted report that contains optimization recommendations for the query, and many other useful information to facilitate easy optimization. More specifically, the SQA report 800 may be a text report, and may include, without limitation, an Observations and Recommendations section 810, a Top Events at a Glance section 820, a Top Time Consuming Operations section 830, a Missing or Stale Optimizer Statistics section 840, an Instance Load Profile section 850, a Data Profile section 860, and a SQL Execution Plan section 870.

In an example, the Observations and Recommendations section 810 may capture the observations from the anti-pattern analysis on SQL run time data, and also provide recommendations that may help to address the same. The Observations and Recommendations section 810 may associate the observation with the specific step or steps in the execution plan, so it becomes very simple for the end user to identify the source of the problem. Also, the Observations and Recommendations section 810 captures the impact of each observation on the overall response time of the query.

The Top Events at a Glance section 820 of the report may capture a predetermined number (e.g., 5) of top wait events observed during execution of the SQL, which may account for more than a predetermined threshold value (e.g., 10%) of the execution time.

The Top Time Consuming Operations section 830 may capture a predetermined number (e.g., 5) of top operations observed during execution of the SQL, which accounts for more than a predetermined threshold value (e.g., 10%) of the execution time.

The Missing or Stale Optimizer Statistics section 840 may capture information about any objects used in the SQL with missing or stale optimizer statistics.

The Instance Load Profile section 850 may capture information about load on the database instance when the SQA was executing. The Instance Load Profile section 850 may help to isolate variations in execution time due to variations in load on the database instance.

The Data Profile section 860 may capture information about actual volume of data coming out from the different row sources, useful for verifying the cardinality estimations of the optimizer.

The SQL Execution Plan section 870 may use DBMS_X-PLAN to capture SQL execution plan and predicates information.

The SQA system as provided in the above noted disclosure offers a significant improvement over other systems due to a large array of unique features, some of which are exemplarily discussed below.

The SQA quality analyzer system may be implemented as a cloud native spring boot application, which may be hosted on a private cloud. Accordingly, the SQA system may be accessible within an entire network of an organization. Further, since the SQA system does not require any database specific installation, it can be leveraged by any application team working within an organization using Oracle databases. Although various aspects of the present application have been disclosed with respect to the Oracle database system as the RBDMS, aspects of the present disclosure are not limited thereto, such that any RBDMS may be utilized.

As compared to other systems, the SQA system is extremely lightweight and the resource requirements at the target database site may be negligible, as the SQA system works with performance related data, with no references to the underlying data accessed by the SQL. Also, the resource footprint may not dependent on size of the query, and the SQA system may provide uniform results for small to very large queries. In contrast, in the other popular systems in the market today, resource consumption is directly proportional to the size of the query due to the increased variables in terms of access order and access path. Accordingly, the SQA system provides an improved technical performance in processing larger queries.

The optimization model as provided by the SQA system scores over other systems in terms of ease of use and granularity of information provided. The recommendations may be presented in a very easy to understand format, so that it can be actioned by developers with very limited knowledge of databases. Also, the optimization model ties back the recommendations to a specific line in the execution plan, which is the most granular level in the execution plan, thus facilitating easier remediation and automation.

Further, the scoring model is highly comprehensive, as it takes into account various factors including resource usage, execution time, impact of each step in the execution plan and the number of anti-patterns found in the execution plan. As such, the scoring model is reflective of the quality of SQL, which may be effective to make more informed decision.

Moreover, the anti-patterns and thresholds may be configurable according to system specific needs and performance goals. Such that, the configurable thresholds offer great deal of flexibility and customization for different workloads (e.g., OLTP and OLAP) and specific system needs.

The SQA system exemplarily disclosed herein may have a far reaching application in the world of Relational Database Management Systems (RDBMS). Any enterprise utilizing RDBMS for data processing and storage may be able to benefit. In an example, in a single organization, there may be more than 15k installations of different RDBMS systems, and all such systems may benefit from the SQA system by way of increased production stability.

Further, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure.

Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of driving SQL optimization in a relational database by anti-pattern analysis of dynamic performance characteristics for evaluating SQL quality, the method comprising:
   receiving, at a server and via a cloud network, a SQL statement;
   analyzing, at the server, a first execution plan and a second execution plan for the SQL statement prior to execution of the SQL statement;
   detecting a presence of at least one first anti-pattern included in the first execution plan and a presence of at least one second anti-pattern included in the second execution plan prior to execution of the SQL statement, wherein the at least one first-anti pattern and the at least one second anti-pattern is stored in a library of anti-patterns;
   determining whether the first execution plan including the detected at least one first anti-pattern is to be executed;
   determining whether the second execution plan including the detected at least one second anti-pattern is not to be executed;
   calculating a quality index value for each of the first execution plan and the second execution plan by performing a weighted analysis of a plurality of attributes including each of a number of anti-patterns detected, impact of the anti-patterns on overall response time, shared resource usage, response time and statistics profile;
   determining whether the quality index value for each of the first execution plan and the second execution plan is greater than or equal to a predetermined threshold value, wherein the predetermined threshold value is automatically adjusted according to an environment type;
   when the quality index value of the first execution plan is determined to be greater than or equal to the predetermined threshold value, determining that the first execution plan is to be executed and sending the execution plan to a production environment and executing the first execution plan;
   when the quality index value of the second execution plan is determined to be less than the predetermined threshold value, determining that the second execution plan is not to be executed and sending the second execution plan to a client terminal without executing the second execution plan for recoding and presenting a list of recommendations for remediation of the at least one second anti-pattern detected,
   wherein the impact of the antipatterns is based on:
      determining a presence of a missing optimizer statistic among optimizer statistics, the optimizer statistics including a collection of data describing a database, and objects included in the database,
      determining whether the optimizer is unable to accurately compute cardinality, and
      determining a number of objects used in the SQL statement; and
   based on the determined impact of the anti-patterns with respect to the predetermined threshold value, the library of anti-patterns is adjusted to add or remove one or more anti-patterns.

2. The method according to claim 1, wherein the at least one first anti-pattern or the at least second one anti-pattern is identified based on run time statistics and execution plan.

3. The method according to claim 1, wherein the at least one first anti-pattern or the at least second one anti-pattern is a number of objects above a predetermined value.

4. The method according to claim 1, further comprising:
   identifying an execution time for executing the SQL statement,
   wherein the at least first one anti-pattern or the at least second one anti-pattern includes at least one operation that accounts for more than a predetermined percentage of execution time of executing the SQL statement.

5. The method according to claim 1, further comprising:
   identifying an execution time for executing the SQL statement,
   wherein the at least one first anti-pattern or the at least second one anti-pattern includes at least one wait event that accounts for more than a predetermined percentage of execution time of executing the SQL statement.

6. The method according to claim 1, wherein the at least one first anti-pattern or the at least second one anti-pattern includes an object referenced in the SQL statement with missing or stale optimizer statistics.

7. The method according to claim 1, wherein the first execution plan is selected for execution based on the optimizer statistics in an environment.

8. The method according to claim 1, wherein the at least one first anti-pattern or the at least second one anti-pattern is manually registered.

9. The method according to claim 1, wherein the at least one first anti-pattern or the at least second one anti-pattern is automatically registered based on a pattern identification performed by a machine learning algorithm.

10. The method according to claim 1, further comprising:
determining an environment identifier specifying a particular environment; and
identifying a corresponding list of anti-patterns and thresholds based on the determined environment identifier,
wherein the at least one first anti-pattern or the at least second one anti-pattern is identified based on the list of anti-patterns and the thresholds corresponding to the determined environment identifier.

11. The method according to claim 10, wherein threshold values are set differently for different anti-patterns.

12. The method according to claim 10, wherein a threshold value for the at least one first anti-pattern or the at least second one anti-pattern is set differently for different environments.

13. The method according to claim 1, wherein the detection of the at least one first anti-pattern or the at least second one anti-pattern comprises:
identifying
pre-configured patterns in the first or second execution plan that are known to cause degradation in performance,
deviations from corresponding thresholds for SQL runtime statistics,
one or more wait events that account for more than a predetermined percentage of execution time of the SQL statement,
one or more operations that account for more than the predetermined percentage of execution time of the SQL statement, or
one or more objects referenced in the SQL statement with missing or stale optimizer statistics.

14. The method according to claim 1, wherein the SQL quality index value ranges between 0 and 100.

15. The method according to claim 1, wherein the predetermined threshold values are configurable limits based on system resources.

16. The method according to claim 1, further comprising generating a formatted text report including an optimization recommendation for the SQL statement.

17. The method according to claim 1, wherein the at least one first anti-pattern or the at least second one anti-pattern is detected by comparing run time statistics of the SQL statement with an evolving list of anti-patterns.

18. A SQL quality analyzer system, comprising:
a processor;
a memory; and
a communication circuit,
wherein the processor is configured to:
receive, via a cloud network, a SQL statement;
analyze a first execution plan and a second execution plan for the SQL statement prior to execution of the SQL statement;
detect a presence of at least one first anti-pattern included in the first execution plan and a presence of at least one second anti-pattern included in the second execution plan prior to execution of the SQL statement, wherein the at least one first-anti pattern and the at least one second anti-pattern is stored in a library of anti-patterns;
determine whether the first execution plan including the detected at least one first anti-pattern is to be executed;
determine whether the second execution plan including the detected at least one second anti-pattern is not to be executed;
calculate a quality index value for each of the first execution plan and the second execution plan by performing a weighted analysis of a plurality of attributes including each of a number of anti-patterns detected, impact of the anti-patterns on overall response time, shared resource usage, response time and statistics profile;
determine whether the quality index value for each of the first execution plan and the second execution plan is greater than or equal to a predetermined threshold value, wherein the predetermined threshold value is automatically adjusted according to an environment type;
when the quality index value of the first execution plan is determined to be greater than or equal to the predetermined threshold value, the first execution plan is determined to be executed, sent to a production environment, and execute the first execution plan;
when the quality index value of the second execution plan is determined to be less than the predetermined threshold value, the second execution plan is determined not to be executed and sent to a client terminal without executing the second execution plan for recoding and a list of recommendations for remediation of the at least one second anti-pattern detected is presented on the client terminal,
wherein the impact of the antipatterns is based on:
determining a presence of a missing optimizer statistic among optimizer statistics, the optimizer statistics including a collection of data describing a database, and objects included in the database,
determining whether the optimizer is unable to accurately compute cardinality, and
determining a number of objects used in the SQL statement; and
based on the determined impact of the anti-patterns with respect to the predetermined threshold value, the library of anti-patterns is adjusted to add or remove one or more anti-patterns.

19. A non-transitory computer readable storage medium that stores a computer program for performing a projected graph based prediction, the computer program, when executed by a processor, causing a system to perform a process comprising:
receiving, at a server and via a cloud network, a SQL statement;
analyzing, at the server, a first execution plan and a second execution plan for the SQL statement prior to execution of the SQL statement;
detecting a presence of at least one first anti-pattern included in the first execution plan and a presence of at least one second anti-pattern included in the second execution plan prior to execution of the SQL statement, wherein the at least one first-anti pattern and the at least one second anti-pattern is stored in a library of anti-patterns;

determining whether the first execution plan including the detected at least one first anti-pattern is to be executed;

determining whether the second execution plan including the detected at least one second anti-pattern is not to be executed;

calculating a quality index value for each of the first execution plan and the second execution plan by performing a weighted analysis of a plurality of attributes including each of a number of anti-patterns detected, impact of the anti-patterns on overall response time, shared resource usage, response time and statistics profile;

determining whether the quality index value for each of the first execution plan and the second execution plan is greater than or equal to a predetermined threshold value, wherein the predetermined threshold value is automatically adjusted according to an environment type;

when the quality index value of the first execution plan is determined to be greater than or equal to the predetermined threshold value, determining that the first execution plan is to be executed and sending the execution plan to a production environment and executing the first execution plan;

when the quality index value of the second execution plan is determined to be less than the predetermined threshold value, determining that the second execution plan is not to be executed and sending the second execution plan to a client terminal without executing the second execution plan for recoding and presenting a list of recommendations for remediation of the at least one second anti-pattern detected, wherein the impact of the antipatterns is based on:
  determining a presence of a missing optimizer statistic among optimizer statistics, the optimizer statistics including a collection of data describing a database, and objects included in the database,
  determining whether the optimizer is unable to accurately compute cardinality, and
  determining a number of objects used in the SQL statement; and based on the determined impact of the anti-patterns with respect to the predetermined threshold value, the library of anti-patterns is adjusted to add or remove one or more anti-patterns.

* * * * *